(12) United States Patent  
Benhase et al.

(10) Patent No.: US 8,949,536 B2
(45) Date of Patent: Feb. 3, 2015

(54) PREFETCHING SOURCE TRACKS FOR DESTAGING UPDATED TRACKS IN A COPY RELATIONSHIP

(71) Applicant: International Business Machines Corporation, Armonk, NY (US)

(72) Inventors: Michael T. Benhase, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/150,763

(22) Filed: Jan. 8, 2014

(65) Prior Publication Data

US 2014/0122808 A1 May 1, 2014

Related U.S. Application Data

(63) Continuation of application No. 13/461,485, filed on May 1, 2012, now Pat. No. 8,656,104, which is a continuation of application No. 13/189,329, filed on Jul. 22, 2011, now Pat. No. 8,566,530.

(51) Int. Cl.
  G06F 12/00 (2006.01)
  G06F 11/14 (2006.01)
  G06F 12/08 (2006.01)

(52) U.S. Cl.
  CPC ............ G06F 12/0862 (2013.01); G06F 11/14 (2013.01)
  USPC ........................................................ 711/119

(58) Field of Classification Search
  None
  See application file for complete search history.

(56) References Cited

U.S. PATENT DOCUMENTS

| 6,381,677 | B1 | 4/2002 | Beardsley et al. |
| 6,611,901 | B1 | 8/2003 | Micka et al. |
| 2002/0178331 | A1 | 11/2002 | Beardsley et al. |
| 2006/0069871 | A1 | 3/2006 | Gill et al. |

(Continued)

FOREIGN PATENT DOCUMENTS

CN  101833422  9/2010

OTHER PUBLICATIONS

INCITS, "Information Technology—SCSI Block Commands—3 (SBC-3)", American National Standard, Working Draft, Project T10/xxxx-D, Reference No. ISO/IED 14776-xxx:200x ANSI INCITS.***.200x, Sep. 9, 2005, 146 pp.

(Continued)

*Primary Examiner* — Duc Doan
(74) *Attorney, Agent, or Firm* — David W. Victor; Konrad Raynes Davda & Victor LLP

(57) ABSTRACT

A point-in-time copy relationship associates tracks in a source storage with tracks in a target storage. The target storage stores the tracks in the source storage as of a point-in-time. A point-in-time copy relationship associates tracks in the source storage with tracks in the target storage, wherein the target storage stores the tracks in the source storage as of a point-in-time. A write request is received including an updated source track for a point-in-time source track in the source storage in the point-in-time copy relationship, wherein the point-in-time source track was in the source storage at the point-in-time the copy relationship was established. The updated source track is stored in a cache device. A prefetch request is sent to the source storage to prefetch the point-in-time source track in the source storage subject to the write request before destaging the updated source track to the source storage.

20 Claims, 9 Drawing Sheets

(56) References Cited

U.S. PATENT DOCUMENTS

| | | |
|---|---|---|
| 2006/0090036 A1 | 4/2006 | Zohar et al. |
| 2010/0017591 A1 | 1/2010 | Smith et al. |
| 2011/0320687 A1 | 12/2011 | Belluomini et al. |
| 2013/0024613 A1 | 1/2013 | Benhase et al. |
| 2013/0024624 A1 | 1/2013 | Benhase et al. |
| 2013/0024625 A1 | 1/2013 | Benhase et al. |
| 2013/0024626 A1 | 1/2013 | Benhase et al. |
| 2013/0024627 A1 | 1/2013 | Benhase et al. |
| 2013/0124803 A1 | 5/2013 | Benhase et al. |

OTHER PUBLICATIONS

Wikipedia, "Standard RAID Levels", [online], [retrieved on Jun. 16, 2011]. Retrieved from the Internet at <URL://http://en.wikipedia.org/w/index.index.php?title=Standard_RAID_levels&print>, 13 pp.

PrelimAmend dated May 24, 2012, pp. 10, for U.S. Appl. No. 13/189,271, filed Jul. 22, 2011.

NOA dated Apr. 23, 2013, pp. 21, for U.S. Appl. No. 13/189,271, filed Jul. 22, 2011.

NOA dated Jun. 14, 2013, pp. 16, for U.S. Appl. No. 13/189,271, filed Jul. 22, 2011.

NOA dated Oct. 4, 2013, pp. 13, for U.S. Appl. No. 13/189,271, filed Jul. 22, 2011.

PrelimAmend dated May 24, 2012 pp. 7, for U.S. Appl. No. 13/480,255, filed May 24, 2012.

PrelimAmend dated Apr. 27, 2012, pp. 9, for U.S. Appl. No. 13/189,285, filed Jul. 22, 2011.

NOA dated May 17, 2013, pp. 20, for U.S. Appl. No. 13/189,285, filed Jul. 22, 2011.

RCE and IDS filed Jul. 28, 2013, for U.S. Appl. No. 13/189,285, filed Jul. 22, 2011.

NOA dated Sep. 3, 2013, pp. 14, for U.S. Appl. No. 13/189,285, filed Jul. 22, 2011.

PrelimAmend dated Apr. 27, 2012, pp. 6, for U.S. Appl. No. 13/458,791, filed Apr. 27, 2012.

PrelimAmend dated May 1, 2012, pp. 9, for U.S. Appl. No. 13/189,329, filed Jul. 22, 2011.

NOA dated Jun. 13, 2013, pp. 24, for U.S. Appl. No. 13/189,329, filed Jul. 22, 2011.

PrelimAmend dated May 1, 2012, pp. 6, for U.S. Appl. No. 13/461,485, filed May 1, 2012.

Notice of Allowance dated Oct. 2, 2013, pp. 28, for U.S. Appl. No. 13/461,485, filed May 1, 2012.

PCT International Search Report & Written Opinion dated Nov. 15, 2012 for Application No. PCT/IB2012/053351 filed Jul. 2, 2012.

English translation of CN101833422 filed Sep. 15, 2010.

Notice of Allowance dated Feb. 10, 2014, pp. 28, for U.S. Appl. No. 13/480,255, filed May 24, 2012.

Notice of Allowance, dated Oct. 4, 2013, pp. 13, for U.S. Appl. No. 13/189,271, filed Jul. 22, 2011.

Copy Relationship Information

Prefetch Request

… …

PREFETCHING SOURCE TRACKS FOR DESTAGING UPDATED TRACKS IN A COPY RELATIONSHIP

CROSS-REFERENCE TO RELATED APPLICATION

This application is a continuation of U.S. patent application Ser. No. 13/461,485, filed May 1, 2012, which is a continuation of U.S. patent application Ser. No. 13/189,329, filed Jul. 22, 2011, which patent applications are incorporated herein by reference in their entirety.

BACKGROUND OF THE INVENTION

1. Field of the Invention

The present invention relates to a computer program product, system, and method for prefetching source tracks for destaging updated tracks in a copy relationship.

2. Description of the Related Art

In a storage environment, source volumes may be mirrored to target volumes to provide redundant copies of the source volumes at target volumes. A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data from the source to the target volumes. Point-in-time copy techniques, also referred to as point-in-time copies, such as the IBM FlashCopy® (FlashCopy is a registered trademark of International Business Machines, Corp. or "IBM") and Snapshot, typically defer the transfer of a data back or track in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

When an update to a track in the source volume involved in a point-in-time copy relationship is received, the updated track is stored in a cache or memory and subsequently destaged to the source storage according to a cache management algorithm. If the source storage has the copy of the track as of the point-in-time copy, then that copy of the track must be copied to the target volume before the copy of the track in the source storage as of the point-in-time is overwritten. Thus, when performing the destage operation, the source data must be read and transferred to the target volume before the source data is updated. This copy operation is sometimes referred to as a "copy-on-write".

SUMMARY

Provided are a computer program product, system, and method for prefetching source tracks for destaging updated tracks in a copy relationship. A point-in-time copy relationship associates tracks in a source storage with tracks in a target storage. The target storage stores the tracks in the source storage as of a point-in-time. A write request is received including an updated source track for a point-in-time source track in the source storage in the point-in-time copy relationship. The point-in-time source track was in the source storage at the point-in-time the copy relationship was established. The updated source track is stored in a first cache device. A prefetch request is sent to the source storage to prefetch the point-in-time source track in the source storage subject to the write request to a second cache device. A read request is generated to read the source track in the source storage following the sending of the prefetch request. The read source track is copied to a corresponding target track in the target storage.

DETAILED DESCRIPTION

Figure 1:
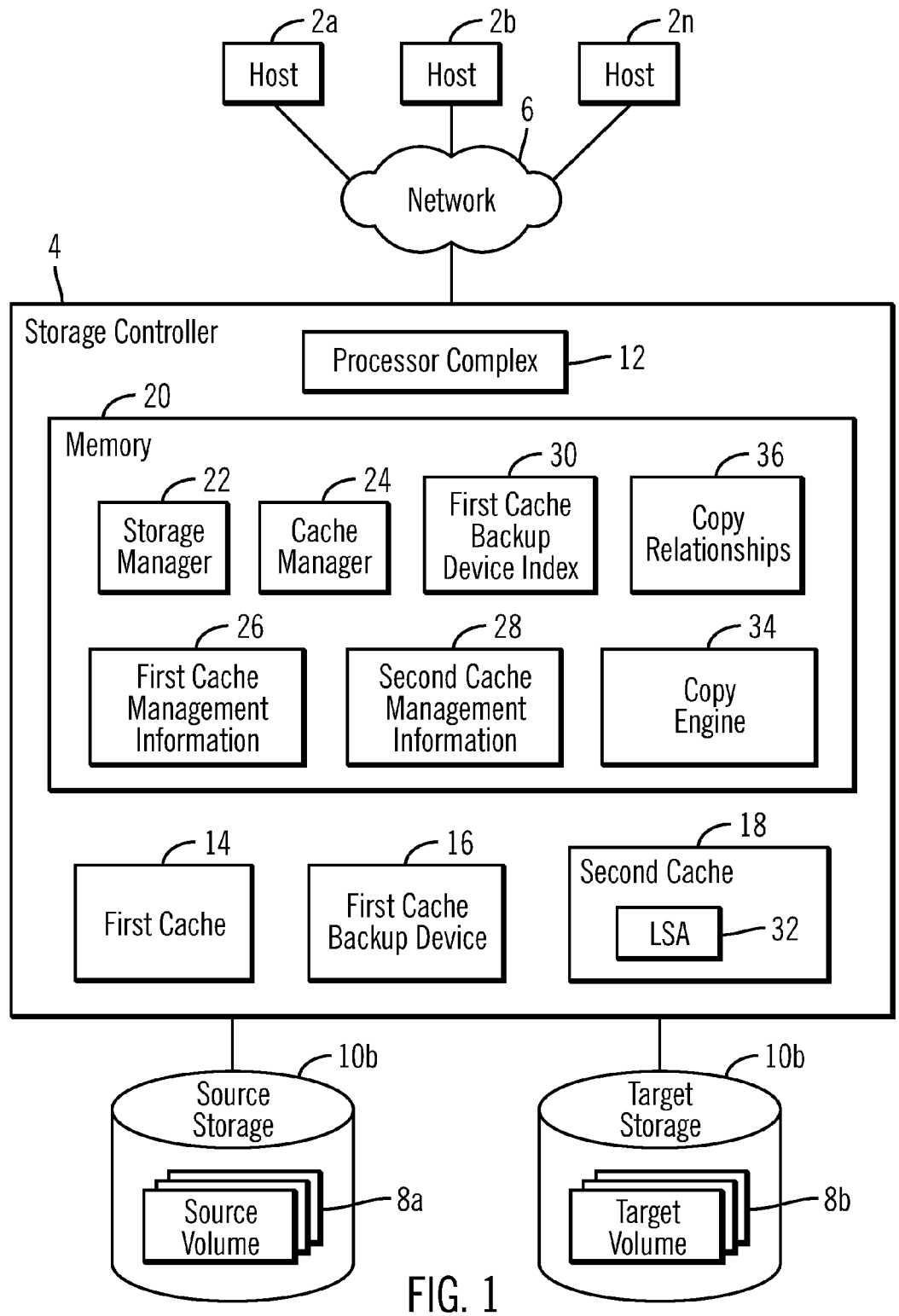
FIG. 1 illustrates an embodiment of a computing environment.

FIG. 1 illustrates an embodiment of a computing environment. A plurality of hosts 2a, 2b . . . 2n may submit Input/Output (I/O) requests to a storage controller 4 over a network 6 to access data at source volumes 8a (e.g., Logical Unit Numbers, Logical Devices, Logical Subsystems, etc.) in a source storage 10a. The source volumes 8a may be mirrored or copied to corresponding target volumes 8b in a target storage 10b.

The storage controller 4 includes a processor complex 12, including one or more processors with single or multiple cores, a first cache 14, a first cache backup device 16, to backup tracks in the cache 14, and a second cache 18. The first 14 and second 18 caches cache data transferred between the hosts 2a, 2b . . . 2n and the source storage 10b. The first cache backup device 16 may provide non-volatile storage of tracks in the first cache 14. In a further embodiment, the first cache backup device 16 may be located in a cluster or hardware on a different power boundary than that of the first cache 14.

The storage controller 4 has a memory 20 that includes a storage manager 22 for managing the transfer of tracks transferred between the hosts 2a, 2b . . . 2n and the storage 10 and a cache manager 24 that manages data transferred between the hosts 2a, 2b . . . 2n and the storage 10 in the first cache 14, first cache backup device 16, and the second cache 18. A track may comprise any unit of data configured in the storages 10a, 10b, such as a track, Logical Block Address (LBA), etc., which is part of a larger grouping of tracks, such as a volume, logical device, etc. The cache manager 24 maintains first cache management information 26 and second cache management information 28 to manage read (unmodified) and write (modified) tracks in the first cache 14 and the second cache 18. A first cache backup device index 30 provides an index of track identifiers to a location in the first cache backup device 16.

The memory 20 further includes a copy engine 34 to manage copy relationships 36 between source volumes 8a and target volumes 8b. For instance, the target storage 10b may store a point-in-time copy of the source volumes 8a in target volumes 8b. The copy engine 34 manages the copying of source volumes 8a to target volumes 8b for copy relationships 36.

The storage manager 22, cache manager 24, and copy engine 34 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

The second cache 18 may store tracks in a log structured array (LSA) 32, where tracks are written in a sequential order as received, thus providing a temporal ordering of the tracks written to the second cache 18. In a LSA, later versions of tracks already present in the LSA are written at the end of the LSA 32. In alternative embodiments, the second cache 18 may store data in formats other than in an LSA.

In one embodiment, the first cache 14 may comprise a Random Access Memory (RAM), such as a Dynamic Random Access Memory (DRAM), and the second cache 18 may comprise a flash memory, such as a solid state device, and the storage 10 is comprised of one or more sequential access storage devices, such as hard disk drives and magnetic tape. The storages 10a, 10b may comprise a single sequential access storage device or may comprise an array of storage devices, such as a Just a Bunch of Disks (JBOD), Direct Access Storage Device (DASD), Redundant Array of Independent Disks (RAID) array, virtualization device, etc. In one embodiment, the first cache 14 is a faster access device than the second cache 18, and the second cache 18 is a faster access device than the storage 10. Further, the first cache 14 may have a greater cost per unit of storage than the second cache 18 and the second cache 18 may have a greater cost per unit of storage than storage devices in the storages 10a, 10b.

The first cache 14 may be part of the memory 20 or implemented in a separate memory device, such as a DRAM. In one embodiment, the first cache backup device 16 may comprise a non-volatile backup storage (NVS), such as a non-volatile memory, e.g., battery backed-up Random Access Memory (RAM), static RAM (SRAM), etc.

The network 6 may comprise a Storage Area Network (SAN), a Local Area Network (LAN), a Wide Area Network (WAN), the Internet, and Intranet, etc.

Figure 2:
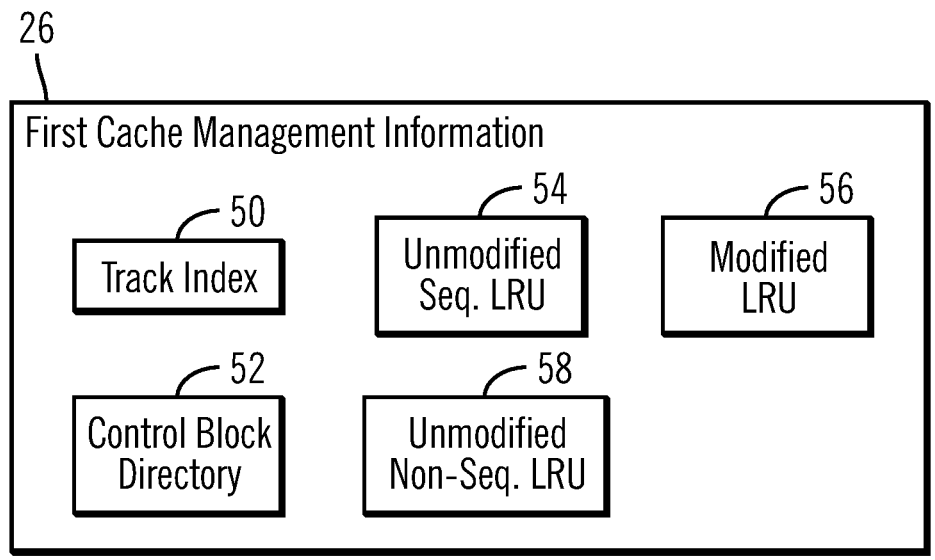
FIG. 2 illustrates an embodiment of first cache management information.

FIG. 2 illustrates an embodiment of the first cache management information 26 including a track index 50 providing an index of tracks in the first cache 14 to control blocks in a control block directory 52; an unmodified sequential LRU list 54 providing a temporal ordering of unmodified sequential tracks in the first cache 14; a modified LRU list 56 providing a temporal ordering of modified sequential and non-sequential tracks in the first cache 14; and an unmodified non-sequential LRU list 58 providing a temporal ordering of unmodified non-sequential tracks in the first cache 14.

In certain embodiments, upon determining that the first cache backup device 16 is full, the modified LRU list 56 is used to destage modified tracks from the first cache 14 so that the copy of those tracks in the first cache backup device 16 may be discarded to make room in the first cache backup device 16 for new modified tracks.

Figure 3:
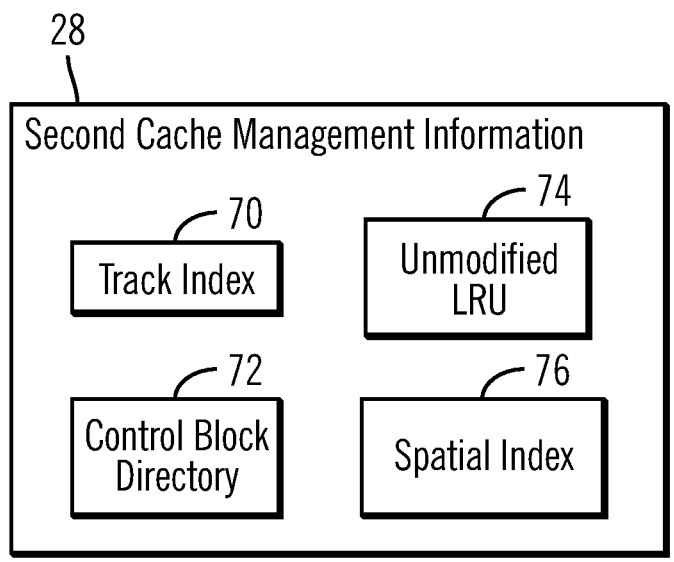
FIG. 3 illustrates an embodiment of second cache management information.

FIG. 3 illustrates an embodiment of the second cache management information 28 including a track index 70 providing an index of tracks in the second cache 18 to control blocks in a control block directory 72; an unmodified list 74 providing a temporal ordering of unmodified tracks in the second cache 18; and a spatial index 76 providing a spatial ordering of the modified tracks in the second cache 18 based on the physical locations in the storage 10 at which the modified tracks are stored.

All the LRU lists 54, 56, 58, and 74 may include the track IDs of tracks in the first cache 14 and the second cache 18 ordered according to when the identified track was last accessed. The LRU lists 54, 56, 58, and 74 have a most recently used (MRU) end indicating a most recently accessed track and a LRU end indicating a least recently used or accessed track. The track IDs of tracks added to the caches 14 and 18 are added to the MRU end of the LRU list and tracks demoted from the caches 14 and 18 are accessed from the LRU end. The track indexes 50 and 70 and spatial index 76 may comprise a scatter index table (SIT). Alternative type data structures may be used to provide the temporal ordering of tracks in the caches 14 and 18 and spatial ordering of tracks in the second cache 18.

Non-sequential tracks may comprise Online Line Transaction Processing (OLTP) tracks, which often comprise small block writes that are not fully random and have some locality of reference, i.e., have a probability of being repeatedly accessed.

Figure 4:
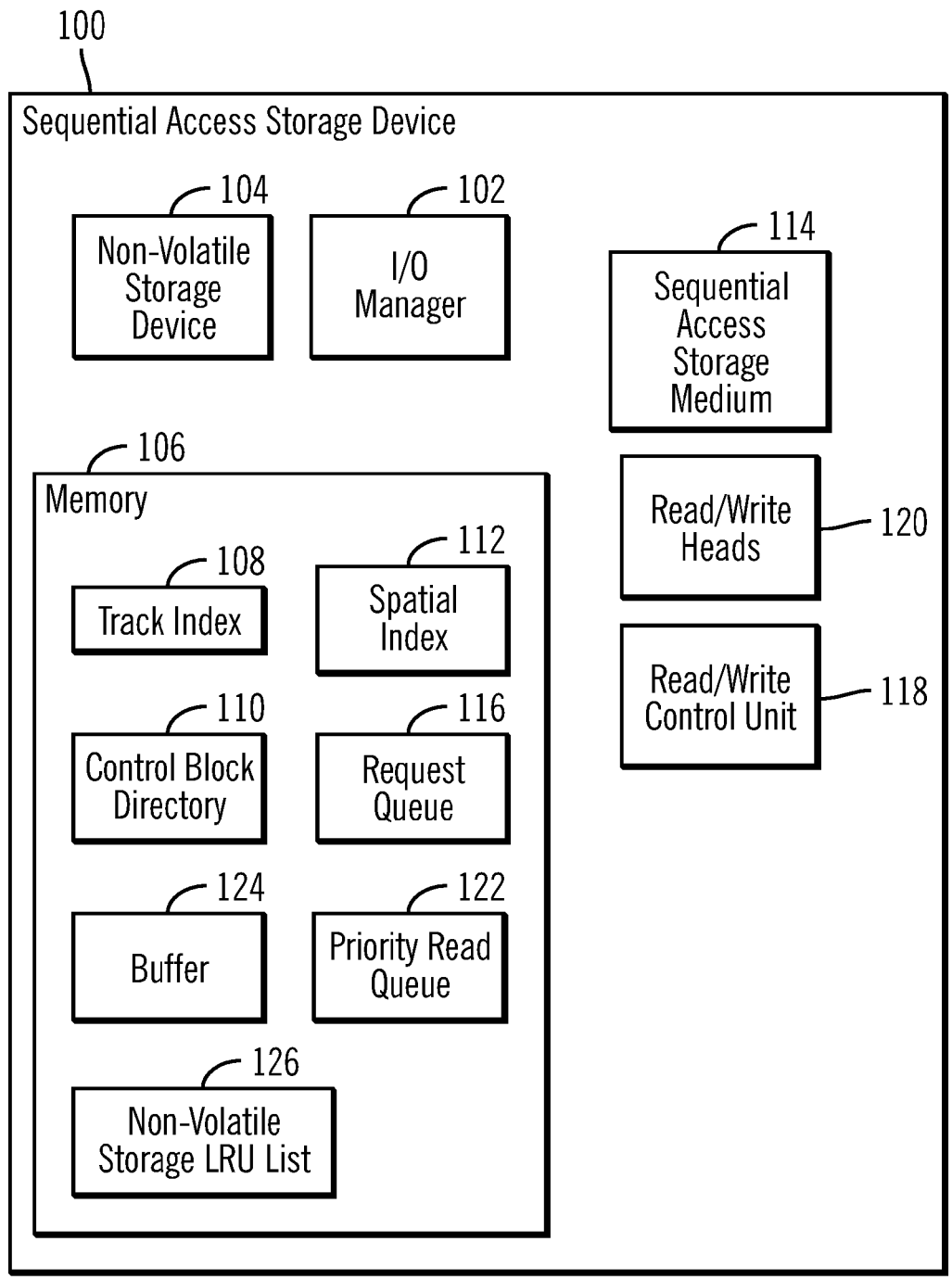
FIG. 4 illustrates an embodiment of a sequential access storage device.

FIG. 4 illustrates an embodiment of a sequential access storage device 100, where the storage 10 may be implemented with one or multiple sequential access storage devices 100. The sequential access storage device 100 includes control logic shown as the I/O manager 102, a non-volatile storage device 104 to buffer modified data, and a memory 106 including a track index 108 providing an index of tracks in the non-volatile storage device 104 to control blocks in a control block directory 110; a spatial index 112 providing a spatial ordering of the tracks (both read and write) in the non-volatile storage 104 on the physical locations in a sequential access storage medium 114 at which the tracks to read or write are stored; and a request queue 116 in which read and write requests are queued. Entries in the request queue 116 may identify the type of request, read or write, and the requested tracks, whose location on the sequential access storage medium 114 can be determined from the spatial index 112. The I/O manager 102 adds read and write request to the request queue 112, and accesses read and write requests from the request queue 112 to execute against a sequential access medium 114. The I/O manager 102 may send commands to a read/write control unit 118 that generates control signals to move one or more actuators having read/write heads 120 to a position on the sequential access storage medium 114 at which data can be read or written.

The memory 106 further includes a read priority queue 122 to buffer high priority read requests. Lower or non-high priority read requests are added to the request queue 116. The storage controller 4 may indicate the priority of read requests submitted to the sequential access storage device 100 in a header field of the read request. In certain embodiments read requests in the priority read queue 122 and the request queue 116 are read based on a temporal order, or order in which they were added to the queues 116 and 122, where the queues may comprise LRU queues. Destage requests are added to the request queue 116 based on a temporal order in which write requests are received. Modified tracks in the non-volatile storage device 104 and read requests in the request queue 116 are processed based on the spatial index 112 so when a destage or read request is processed in the request queue 116, the track to destage or read is selected using the spatial index 112 based on the current position of the read write head 120. Thus, although the read requests and destage requests are added to the request queue 116 according to a temporal order, the are processed in the request queue 116 based on their location in the sequential access storage medium 114 with respect to the read/write heads 120 to minimize the time for the read/write heads 120 to seek and the medium 114 to rotate to access the track locations to read or write.

A buffer 124 in the device 100 may temporarily buffer read and write input requests and data being returned to a read request. The buffer 124 may also be used to temporarily buffer modified tracks for write requests not maintained in the non-volatile storage device, such as for sequential write requests and their modified data. The buffer 124 may be in a separate device than the non-volatile storage device 104 and may comprise smaller storage space than available in the non-volatile storage device 104. Alternatively, some or all of the buffer 124 may be implemented in the non-volatile storage device.

A non-volatile storage (NVS) LRU list 126 provides an LRU queue for tracks buffered in the non-volatile storage device 104, including modified tracks to write to the sequential access storage medium 114 and prefetch tracks. The NVS LRU list 126 may be used to determine tracks to remove from the non-volatile storage device 104 if space needs to be freed in the non-volatile storage device 104.

The sequential access storage medium 114 may comprise one or more hard disk drive platters for a hard disk drive device or magnetic tape. In certain embodiments, the non-volatile storage device 104 may comprise a flash memory device comprised of solid state storage. In certain embodiments, the non-volatile storage device 104, e.g., flash memory, is implemented on the sequential access storage device 100 circuit board within the enclosure including the sequential access storage device 100 components. For instance, the may comprise an 8 GB flash memory device.

Some or all of the functions of the I/O manager 102 may be implemented as code executed by a processor in the sequential access storage device 100. Alternatively, some or all of the functions of the I/O manager 102 may be implemented in an ASIC on the sequential access storage device 100.

In one embodiment where the sequential access storage device 100 includes a non-volatile storage device 104, the storage controller 4 may only include a first cache 14 and not the second cache 18 because the second level cache is implemented as the non-volatile storage device 104 in the sequential access storage device 100. Further, in an embodiment where the storage controller 4 includes the first cache 14 and the second cache 18, the sequential access storage device 100 may or may not include the non-volatile storage device 104.

Figure 5:
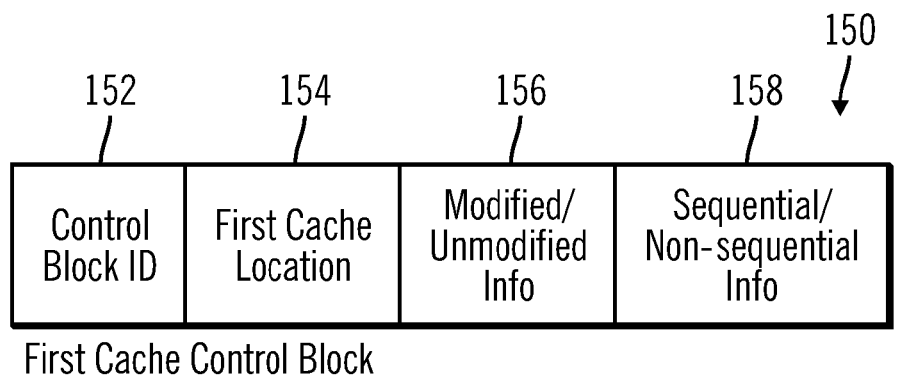
FIG. 5 illustrates an embodiment of a first cache control block.

FIG. 5 illustrates an embodiment of a first cache control block 150 entry in the control block directory 52, including a control block identifier (ID) 152, a first cache location 154 of the physical location of the track in the first cache 14, information 156 indicating whether the track is modified or unmodified, and information 158 indicating whether the track is a sequential or non-sequential access.

Figure 6:
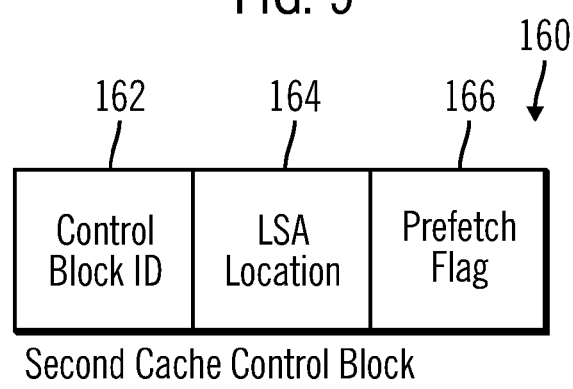
FIG. 6 illustrates an embodiment of a second cache control block.

FIG. 6 illustrates an embodiment of a second cache control block 160 entry in the second cache control block directory 72, including a control block identifier (ID) 162 and an LSA location 164 where the track is located in the LSA 32. In certain embodiments, the second cache control block 160 may further include a prefetch flag 166 indicating whether the track is for a pre-fetch operation so that the prefetch track may be maintained in the second cache 16 longer to be available for the read that will need the prefetch track. The unmodified LRU list 74 may identify unmodified non-sequential tracks demoted from the first cache 14 and promoted to the second cache 18 and pre-fetch tracks read from the storage 10 to pre-fetch for subsequent operations.

Figure 7:
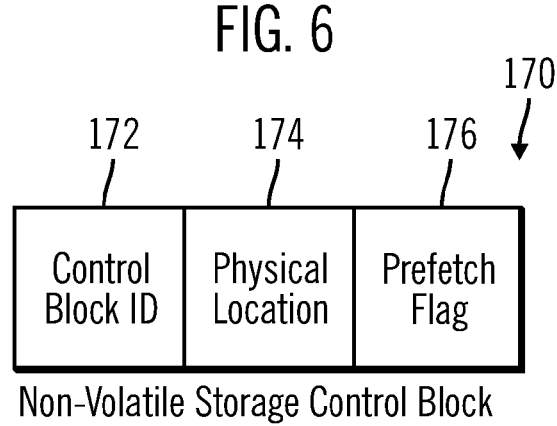
FIG. 7 illustrates an embodiment of a non-volatile storage cache control block.

FIG. 7 illustrates an embodiment of a non-volatile storage control block 170 entry in the non-volatile storage 104 control block directory 110, including a control block identifier (ID) 172 and a physical location 174 at which the track is located, such as an LSA location if the track is stored in a LSA on the non-volatile storage device. In certain embodiments, the non-volatile storage control block 170 may include a prefetch flag 176 indicating whether the track was read from the sequential access storage medium 114 and placed in the non-volatile storage device 104 as part of a prefetch operation. In certain embodiments, tracks that are read from the sequential access storage medium 114 as part of a prefetch operation may be maintained in the non-volatile storage device 104 longer before being removed to free space.

Figure 8:
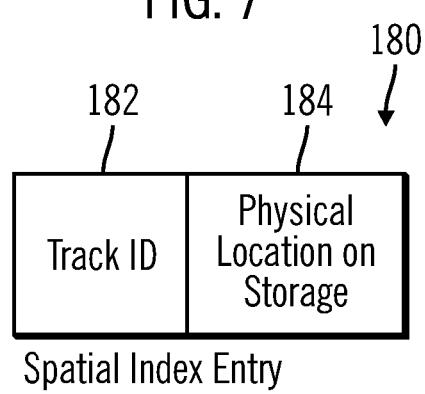
FIG. 8 illustrates an embodiment of a spatial index entry.

FIG. 8 illustrates a spatial index entry 180 including a track identifier 182 of a track in the non-volatile storage device 104 and the physical location 184 of where the track to read or write is stored in the sequential access storage medium 114, such as a cylinder, platter number, angular position on the cylinder, etc.

In an embodiment, the request queue 116 may include low priority read requests and write requests that are selected for processing based on a spatial ordering of where the data is on the sequential access storage medium. When the sequential access storage device 100 comprises a hard disk drive and the sequential access storage medium 114 comprises a magnetic disk, the spatial index 112 indicates a cylinder of the track on magnetic disk. To determine the track in the request queue 116 that can be accessed in the minimal time from the current position of the read/write head 120, the I/O manager 102 may analyze the cylinder and angular position of the tracks to read or write in the spatial index 112 to estimate the times for the read/write head 120 to seek to the cylinders of the tracks and rotate the disk under the read/write head 120 to reach the angular positions of the requested tracks. The I/O manager may then select a track in the request queue 116 having a minimal of the estimated access times.

The priority read queue 122 may include high priority read requests and the requests in the priority read queue 122 may be processed at a higher priority than requests in the request queue 116.

In a further embodiment the sequential access storage device 114 may comprise a hard disk drive having multiple disk platters and multiple write heads to write to each platter. The I/O manager 102 may determine the estimated time to seek and rotate to each modified track on each disk platter from the current position of the write heads to select a modified track having the minimal estimated time to access across the disk platters.

In an alternative embodiment, lower priority requests in the request queue 116 may be processed according to a temporal ordering, not just a spatial ordering of the requested tracks.

In addition, if the I/O manager 102 determines that a destage operation needs to be performed to destage modified tracks in the non-volatile storage device 104 to the sequential access storage medium 114 to free space in the non-volatile storage medium 104, then the destage operation may interrupt the processing of the requests in the priority read queue 122 and the request queue 116.

Figure 9:
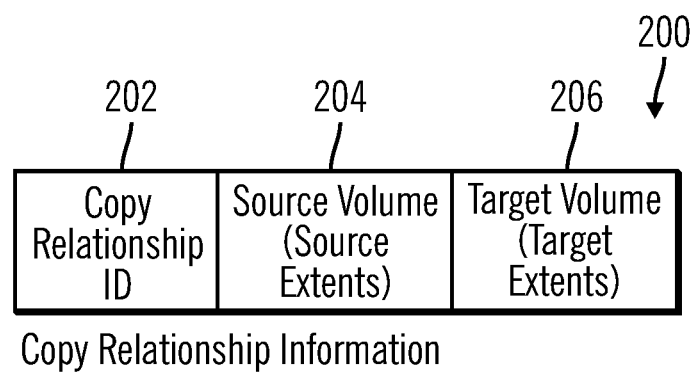
FIG. 9 illustrates an embodiment of copy relationship information.

FIG. 9 illustrates an embodiment of an instance of copy relationship information 200 maintained in the copy relationships 36 for one copy relationship including a copy relationship identifier (ID) 202 identifying a copy relationship of a source volume 204 to copy to a target volume 206.

Figure 10:
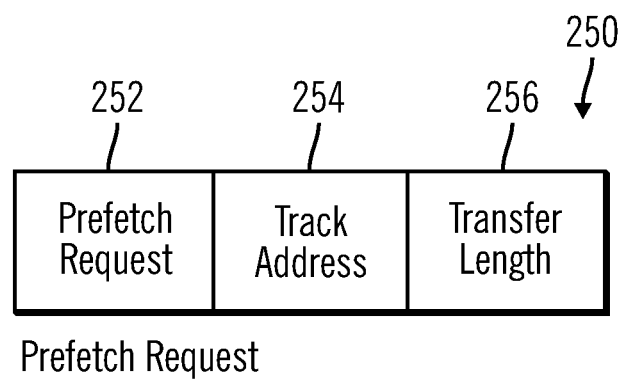
FIG. 10 illustrates an embodiment of a prefetch request.

FIG. 10 illustrates an embodiment of a prefetch request 250, including a prefetch request 252 operation code, a track address 254 indicating a starting track in the sequential access storage medium 114 at which to start prefetching, and a transfer length 726 indicating a start of the prefetch.

Figure 11:
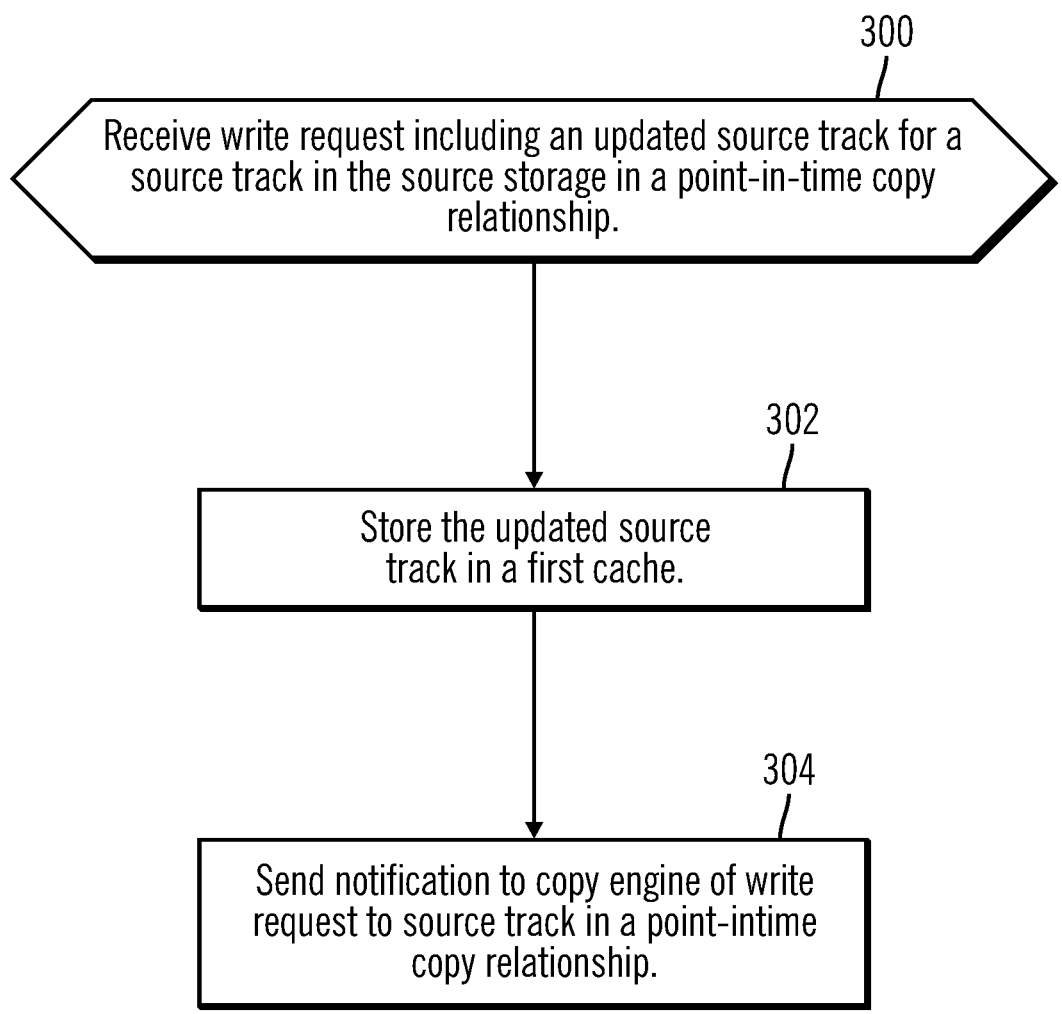
FIGS. 11 and 12 illustrate an embodiment of operations to process a write request including an updated source track in a point-in-time copy relationship.

FIG. 11 illustrates an embodiment of operations performed by the cache manager 24 receiving a write request including an updated source track for a source track in the source storage in a point-in-time copy relationship 32. Upon receiving (at block 300) the write request, the cache manager 24 stores (at block 302) the updated source track in the first cache 14, or a first cache device. The cache manager 22 then sends (at block 304) a notification to the copy engine 34 of the write request to the source track in a point-in-time copy relationship 32. In embodiments where the copy relationship is a point-in-time copy relationship, then the copy engine 34 needs to send the point-in-time source track as of the point-in-time when the copy relationship was established to the target storage 10b before the point-in-time source track is updated at the source storage 10a. A point-in-time track is the version of the track in the source storage as of the point-in-time when the point-in-time copy relationship was established.

Figure 12:
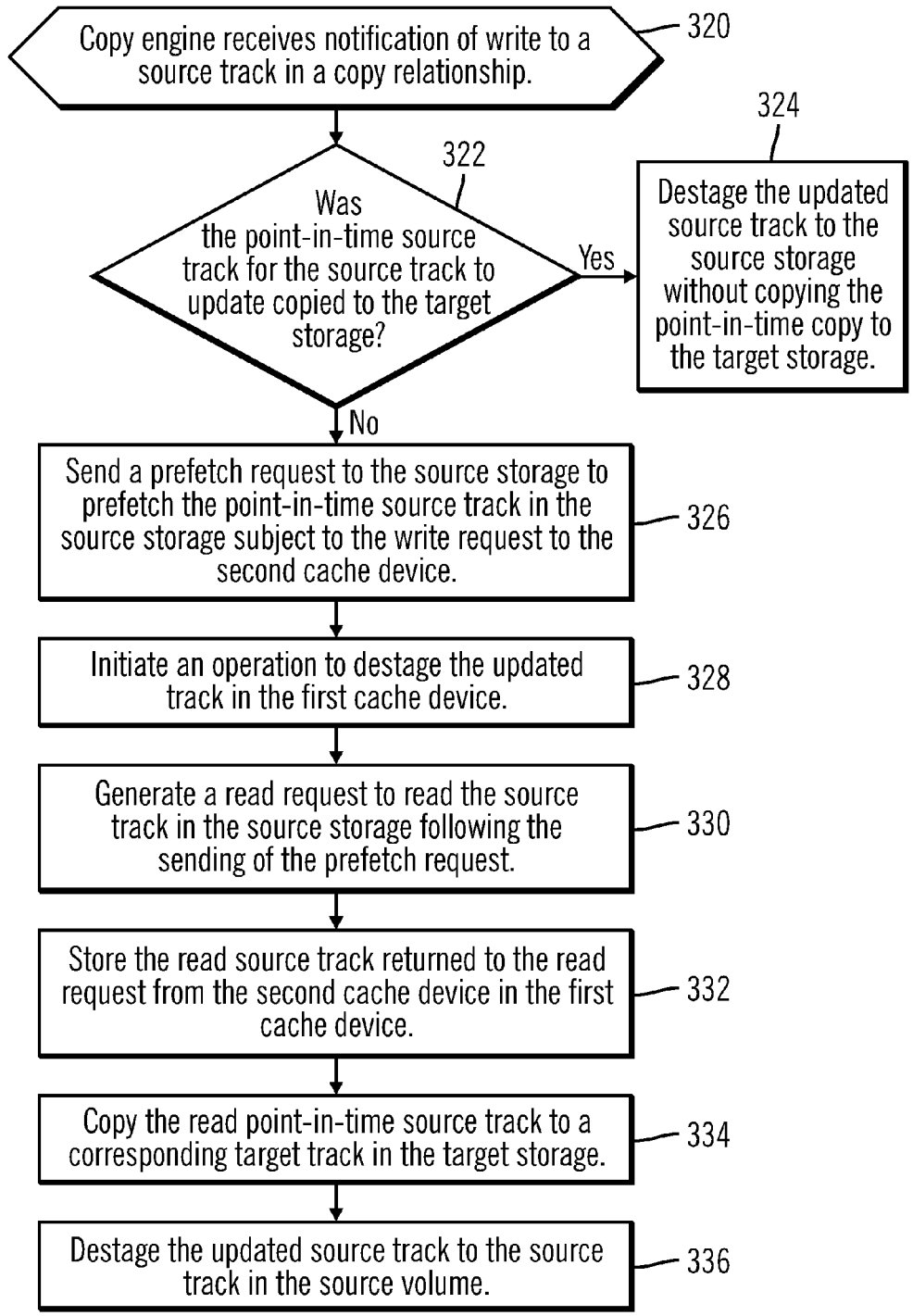

FIG. 12 illustrates an embodiment of operations performed by the copy engine 34 and the cache manager 24 to prefetch the point-in-time source track to send to the target storage 10b before destaging the updated source track to the source storage 10. Upon receiving (at block 320) the notification of the write request having the updated source track, the copy engine 34 determines (at block 322) whether the point-in-time source track for the source track to update was copied to the target storage 10b. This may be determined from copy relationship 32 information indicating the point-in-time source tracks copied to the corresponding target tracks. If (at block 322) the point-in-time source track was already copied to the target storage 10b, then the cache manager 22 destages the updated source track to the source storage 10a without the copy engine 34 copying the point-in-time copy to the target storage 10b. If (at block 322) the point-in-time source track has not been copied to the target storage 10b, then the copy engine 34 sends (at block 326) a prefetch request to the source storage 10a to prefetch the point-in-time source track in the source storage 10a, subject to the write request, to the second cache device, which may comprise the second cache 18 in the storage controller 4 (FIG. 1) or the non-volatile storage device 104 in the sequential access storage device 100 (FIG. 4) implementing the source storage 10a having the point-in-time source track.

The cache manager 24 may initiate (at block 328) an operation to destage the updated source track in the first cache 14 in order to free space in the first cache 14. In such case, the copy engine 34 may then need to access the prefetched point-in-time source track to copy to the target storage 10b. To obtain the point-in-time source track, the copy engine 34 generates (at block 330) at least one read request to read the prefetched point-in-time source track from the second cache device (second cache 18 or non-volatile storage device 104). The read point-in-time source track returned to the read request from the second cache device 18, 104 is stored (at block 332) in the first cache device, i.e., the first cache 14. The copy engine 34 copies (at block 334) the read point-in-time source track to a corresponding target track in the target storage 10b. After the copy-on-write is completed, the copy engine 34 may notify the cache manager 24 to destage the updated source track to the source track in the source volume 8a. In this way, the source storage 10a has the most current version of the data and the target storage 10b has tracks as of the point-in-time the point-in-time copy relationship was established.

Figure 13:
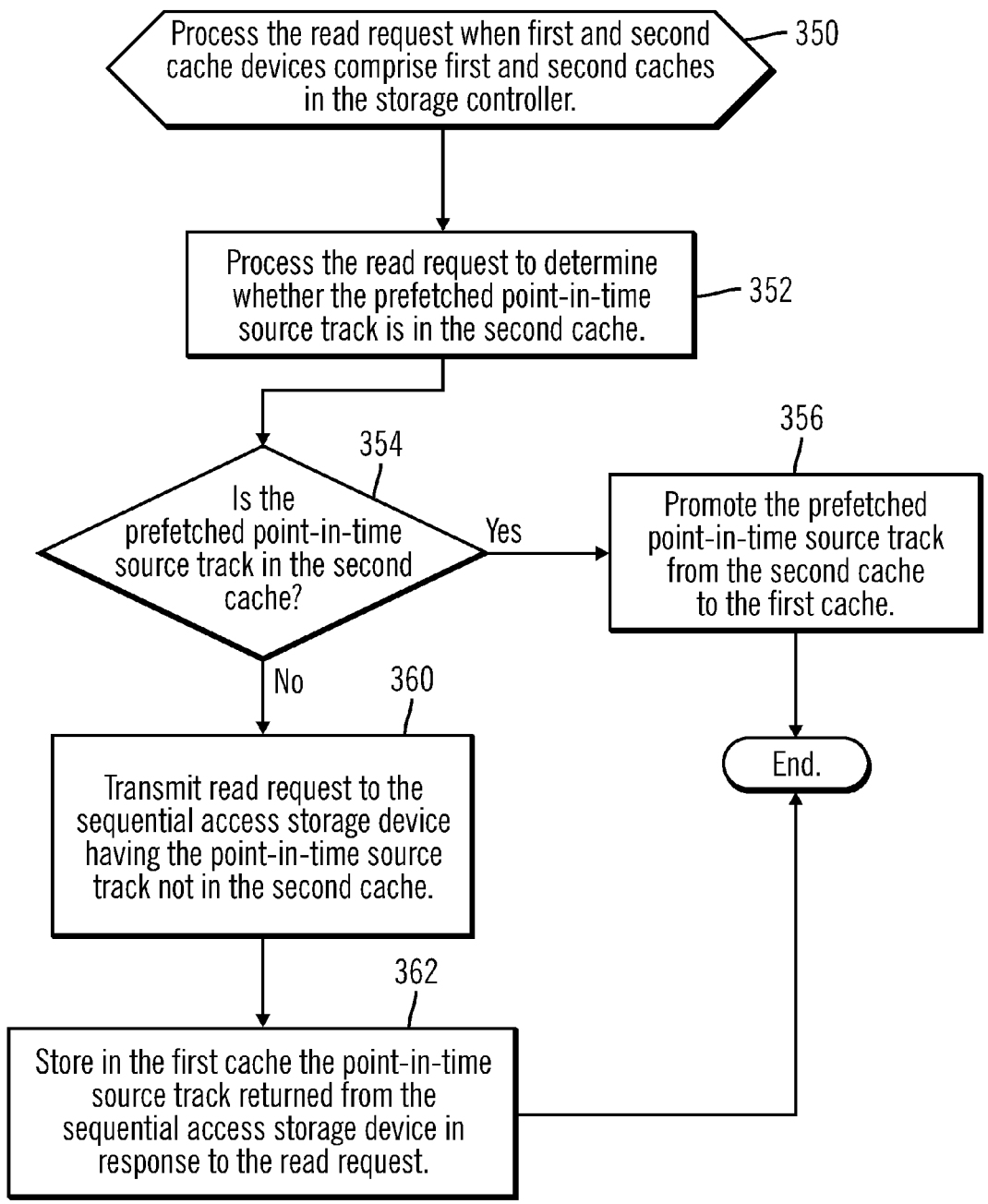
FIGS. 13 and 14 illustrate embodiments of operations to process a read request to read prefetched tracks.

FIG. 13 illustrates an embodiment of operations the copy engine 34 and/or cache manager 24 perform to process the read request when the first and second cache devices comprise the first cache 14 and the second cache 18 in the storage controller 4, respectively. In such an embodiment, upon processing (at block 350) the read request, the storage manager 22 determines (at block 352) whether prefetched point-in-time source track is in the second cache 18. If (at block 354) the point-in-time source track is in the second cache 18, then the cache manager 24 promotes (at block 356) the prefetched point-in-time source track from the second cache 18 to the first cache 14. If (at block 354) the point-in-time source track is not in the second cache 18 (from the no branch of block 354), then the cache manager 24 transmits (at block 360) a read request to the sequential access storage device 100 having the point-in-time source track not in the second cache 18. The prefetched point-in-time source track returned from the sequential access storage device 100 in response to the read request transmitted to the sequential access storage device 100 is stored (at block 362) in the first cache 14.

Figure 14:
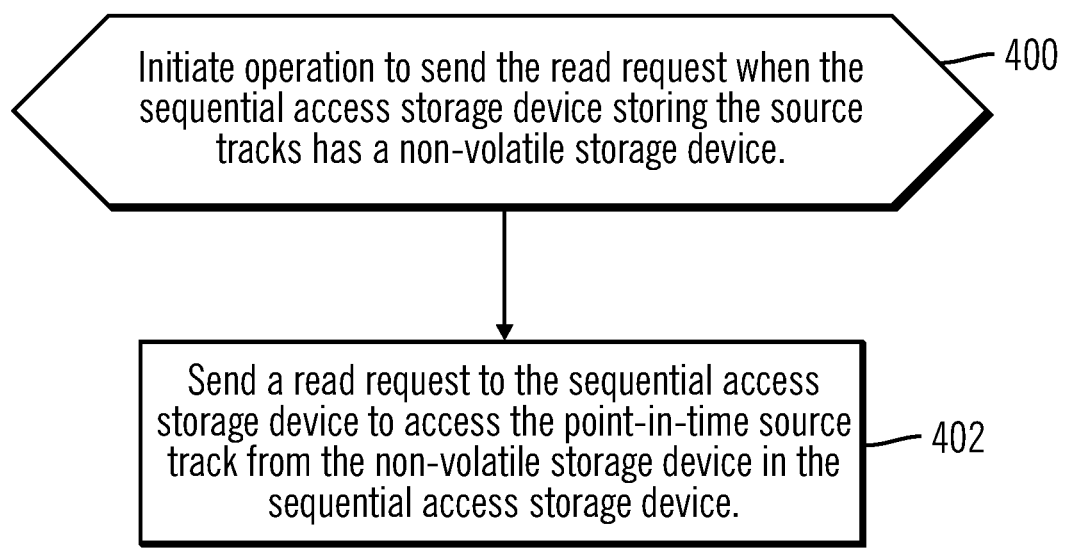

FIG. 14 illustrates an embodiment of operations to send the read request when the sequential access storage device storing the source track includes a non-volatile storage device 104 as shown in FIG. 4, where in such case the second cache device comprises the non-volatile storage device 104 within the sequential access storage device 104. In such embodiments, the prefetched source track is stored in the non-volatile storage device 104 in the sequential access storage device 100 in response to the prefetch requests. Upon initiating (at block 400 the operation to send the read request in such embodiments, the cache manager 24 and/or copy engine 34 sends (at block 402) a read request to the sequential access storage device 100 to access the prefetched point-in-time source track from the non-volatile storage device 104 (second cache device) in the sequential access storage device 100. In one embodiment, the read request may be designated at a high priority, such as a priority higher than the priority at which the prefetch request is submitted to the sequential access storage devices 100. Further, in embodiments where the sequential access storage device 100 includes the non-volatile storage device 104, the storage controller 4 may or may not include the second cache 18 and the prefetched point-in-time source track may be stored in the first cache 14 or the second cache 18.

In described embodiments, the prefetch request for the point-in-time source track is designated to be processed at a lower priority than the read request. The prefetch request is added to the request queue 116, where it is processed according to a spatial ordering of the read and write tracks in the request queue 116. Whereas, if the read request is to be processed against the sequential access storage medium 114, such as the case if the prefetch source tracks were not in the non-volatile storage device 104, then the read request would be processed at a higher priority based on a temporal ordering of the read requests in the priority read queue 122.

For instance, the copy engine 34 will need the old point-in-time source track before the destage of the updated source track. In such case, the copy engine 34 can prefetch the point-in-time source track at a lower priority than the high priority at which the cache manager 24 is destaging the updated source track from the first cache 14. When the cache manager 24 needs to destage the updated tracks, then the copy engine 34 issues the read request for the point-in-time source track that was prefetched designating a high priority, higher than the priority at which the prefetch request was sent.

Described embodiments provide techniques for allowing the use of a second level cache device between a primary or first level cache device and a storage to store point-in-time tracks from the sequential access storage device to make available when an updated source track in a point-in-time copy relationship needs to be destaged. The described embodiments reduce read latency in reading the point-in-time source track at the time of the destage because the point-in-time track is prefetched, at a lower priority, to make available in a faster access device when needed to copy-on-write for the destage.

Further benefits are realized by allowing priority indication of read requests so that high priority read requests and the prefetch requests will not be unduly delayed in being processed as a result of operations to destage modified tracks to the sequential access storage medium 114. In this way, high priority read requests, such as the read requests to read the prefetched data, may be processed at a higher priority than lower priority prefetch, read, and destage requests to destage modified tracks for write requests cached in the non-volatile storage device 104.

Further, with the described embodiments, the lower priority prefetch, read requests, and writes in the request queue 116 are processed based on a spatial ordering of the received lower priority prefetch requests, read requests and destage requests for write requests in the request queue and a current position of the read/write head 120 to optimize the seek and latency delays for the read and write requests. High priority read requests to read the prefetched point-in-time source tracks are processed based on a temporal ordering of the received high priority read requests.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 11-14 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining a copy relationship between tracks in a source storage and a target storage and communicating with a cache device, the computer program product comprising a computer readable storage medium having computer readable program code embodied therein that executes to perform operations, the operations comprising:
    maintaining a point-in-time copy relationship associating tracks in the source storage with tracks in the target storage, wherein the target storage stores the tracks in the source storage as of a point-in-time;
    receiving a write request including an updated source track for a point-in-time source track in the source storage in the point-in-time copy relationship, wherein the point-in-time source track was in the source storage at the point-in-time the copy relationship was established;
    storing the updated source track in the cache device; and
    sending a prefetch request to the source storage to prefetch the point-in-time source track in the source storage subject to the write request before destaging the updated source track to the source storage.

2. The computer program product of claim 1, wherein the operations further comprise:
    copying the pre-fetched point-in-time source track to a corresponding target track in the target storage.

3. The computer program product of claim 2, wherein the operations further comprise:
    destaging the updated source track to the source track in the source storage in response to copying the pre-fetched point-in-time source track to the corresponding target track.

4. The computer program product of claim 1, wherein the cache device comprises a first cache device, wherein the computer program product further communicates with a second cache device, wherein the operations further comprise
    storing the prefetched point-in-time source track in the second cache device; and
    copying the prefetched point-in-time source track stored in the second cache device to a corresponding target track in the target storage.

5. The computer program product of claim 4, wherein the operations further comprise:
    storing the prefetched point-in-time source track in the second cache device in the first cache device, wherein the prefetched point-in-time source track is copied from the first cache device to the corresponding target track in the source storage.

6. The computer program product of claim 4, wherein the second cache device is a faster access device than the first cache device.

7. The computer program product of claim 1, wherein the prefetch request is generated in response to receiving the write request.

8. The computer program product of claim 1, wherein the cache device comprises a first cache device, and wherein the computer program product further communicates with a second cache device, wherein the first and the second cache devices are in a storage controller external to the source storage, wherein the operations further comprise:
    determining whether the prefetched point-in-time source track is in the second cache device;
    promoting the point-in-time source track from the second cache device to the first cache device in response to determining that the prefetched point-in-time source track is in the second cache device;

transmitting the read request to the source storage in response to determining that the point-in-time source track is not in the second cache device; and storing the prefetched point-in-time source track returned in response to the read request in the first cache device.

9. A system for maintaining a copy relationship between tracks in a source storage and a target storage, comprising:
   a processor;
   a cache device; and
   a computer readable storage medium having computer readable program code embodied therein executed by the processor to perform operations, the operations comprising:
      maintaining a point-in-time copy relationship associating tracks in the source storage with tracks in the target storage, wherein the target storage stores the tracks in the source storage as of a point-in-time;
      receiving a write request including an updated source track for a point-in-time source track in the source storage in the point-in-time copy relationship, wherein the point-in-time source track was in the source storage at the point-in-time the copy relationship was established;
      storing the updated source track in the cache device; and
      sending a prefetch request to the source storage to prefetch the point-in-time source track in the source storage subject to the write request before destaging the updated source track to the source storage.

10. The system of claim 9, wherein the operations further comprise:
    copying the pre-fetched point-in-time source track to a corresponding target track in the target storage.

11. The system of claim 10, wherein the operations further comprise:
    destaging the updated source track to the source track in the source storage in response to copying the pre-fetched point-in-time source track to the corresponding target track.

12. The system of claim 9, wherein the cache device comprises a first cache device, further comprising:
    a second cache device,
    wherein the operations further comprise
       storing the prefetched point-in-time source track in the second cache device; and
       copying the prefetched point-in-time source track stored in the second cache device to a corresponding target track in the target storage.

13. The system of claim 12, wherein the operations further comprise:

storing the prefetched point-in-time source track in the second cache device in the first cache device, wherein the prefetched point-in-time source track is copied from the first cache device to the corresponding target track in the source storage.

14. The computer program product of claim 1, wherein the prefetch request is generated in response to receiving the write request.

15. A method, comprising:
    maintaining a point-in-time copy relationship associating tracks in a source storage with tracks in a target storage, wherein the target storage stores the tracks in the source storage as of a point-in-time;
    receiving a write request including an updated source track for a point-in-time source track in the source storage in the point-in-time copy relationship, wherein the point-in-time source track was in the source storage at the point-in-time the copy relationship was established;
    storing the updated source track in a cache device; and
    sending a prefetch request to the source storage to prefetch the point-in-time source track in the source storage subject to the write request before destaging the updated source track to the source storage.

16. The method of claim 15, further comprising:
    copying the pre-fetched point-in-time source track to a corresponding target track in the target storage.

17. The method of claim 16, further comprising:
    destaging the updated source track to the source track in the source storage in response to copying the pre-fetched point-in-time source track to the corresponding target track.

18. The method of claim 15, wherein the cache device comprises a first cache device, further comprising:
    storing the prefetched point-in-time source track in a second cache device; and
    copying the prefetched point-in-time source track stored in the second cache device to a corresponding target track in the target storage.

19. The method of claim 18, further comprising:
    storing the prefetched point-in-time source track in the second cache device in the first cache device, wherein the prefetched point-in-time source track is copied from the first cache device to the corresponding target track in the source storage.

20. The method of claim 15, wherein the prefetch request is generated in response to receiving the write request.

* * * * *